(12) United States Patent
Sakai

(10) Patent No.: US 9,095,925 B2
(45) Date of Patent: Aug. 4, 2015

(54) EARTH ELECTRODE APPARATUS

(75) Inventor: Kensuke Sakai, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1007 days.

(21) Appl. No.: 13/137,675

(22) Filed: Sep. 1, 2011

(65) Prior Publication Data

US 2012/0055904 A1 Mar. 8, 2012

(30) Foreign Application Priority Data

Sep. 8, 2010 (JP) ................................. 2010-200664
Mar. 24, 2011 (JP) ................................. 2011-065358

(51) Int. Cl.
*B23K 11/06* (2006.01)
*B23K 11/30* (2006.01)
*B23K 11/11* (2006.01)

(52) U.S. Cl.
CPC ............. *B23K 11/3009* (2013.01); *B23K 11/11* (2013.01)

(58) Field of Classification Search
USPC ............. 219/84, 119, 120, 136, 86.25, 86.32, 219/86.33
See application file for complete search history.

(56) References Cited

U.S. PATENT DOCUMENTS

| 5,406,166 A * | 4/1995 | Abe et al. ....................... 313/142 |
| 5,424,505 A * | 6/1995 | Kiyota ........................ 219/86.25 |
| 6,608,285 B2 * | 8/2003 | Lefebvre et al. ........... 219/137 R |
| 2001/0050273 A1 * | 12/2001 | Lefebvre et al. ........... 219/137 R |

FOREIGN PATENT DOCUMENTS

JP 2004-136292 5/2004

* cited by examiner

*Primary Examiner* — Dana Ross
*Assistant Examiner* — Ayub Maye
(74) *Attorney, Agent, or Firm* — McGinn IP Law Group, PLLC

(57) ABSTRACT

In an earth electrode apparatus, a cradle having first, second, and third shanks to which first, second, and third earth electrodes can be attached respectively is coupled to a shaft supported by a base. The cradle is coupled thereto in a tiltable manner. If the surface of a workpiece is irregular or inclined, the cradle tilts for balancing with the workpiece to ensure equal contact pressure for the contact of the first, second, and third earth electrodes with the workpiece, thereby offering stable contact irrespective of surface irregularity or inclination. Since a welding current is split to flow into the first, second, and third earth electrodes through respective points of contact thereof with the workpiece, it is possible to reduce current density at each of the points of contact and to avoid heat generation ascribable to conductive resistance at each of the points of contact.

9 Claims, 11 Drawing Sheets

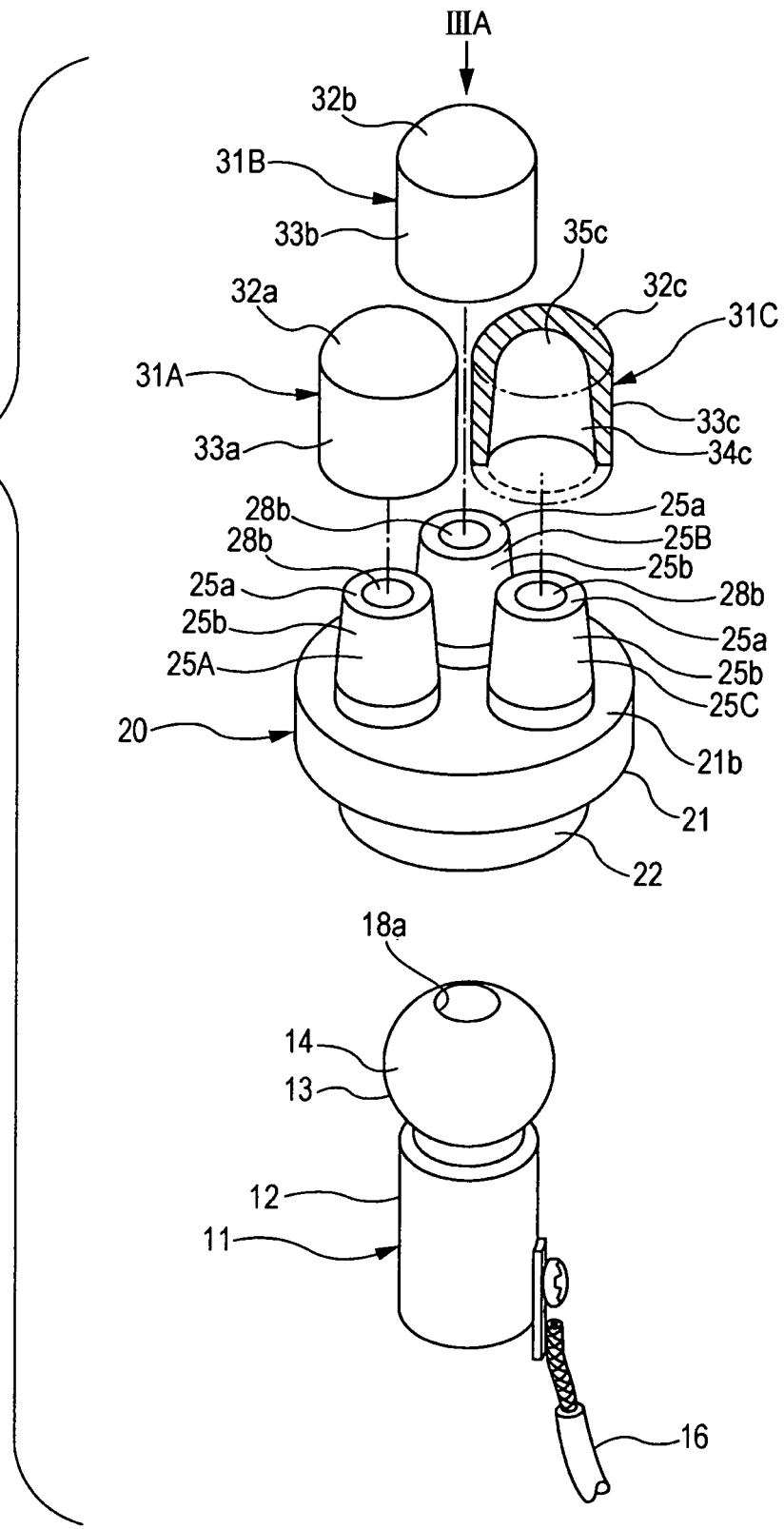

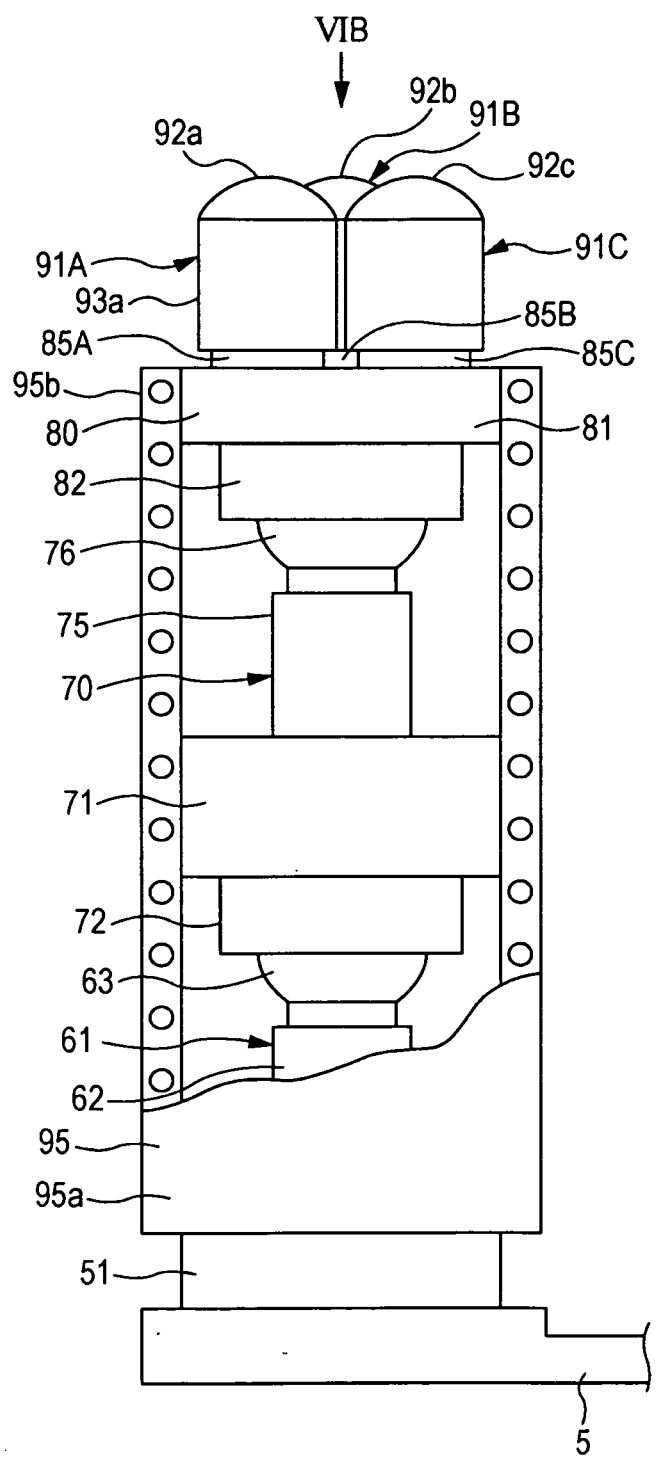

FIG. 6A
FIG. 6B
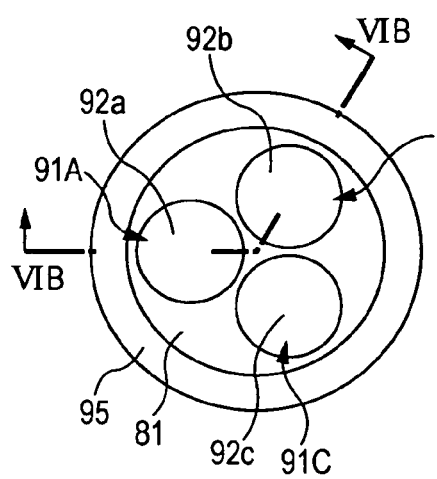
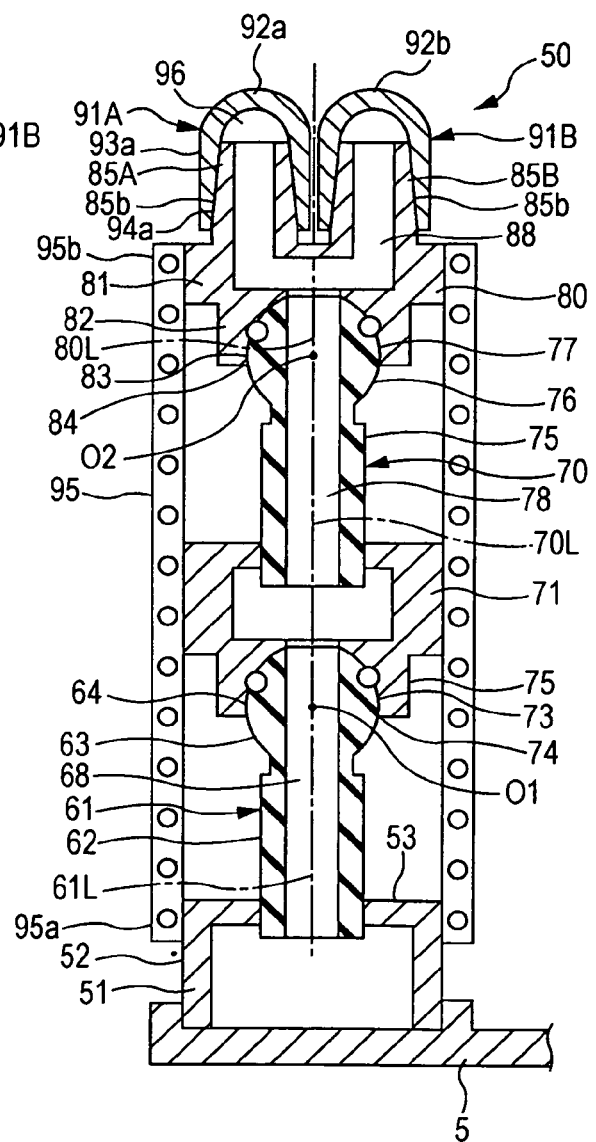

US 9,095,925 B2

EARTH ELECTRODE APPARATUS

CROSS-REFERENCE TO RELATED APPLICATIONS

The present application claims priority from Japanese Patent Application No. 2010-200664 filed on Sep. 8, 2010 and Japanese Patent Application No. 2011-065358 filed on Mar. 24, 2011, the entire contents of which are hereby incorporated by reference.

BACKGROUND OF THE INVENTION

1. Field of the Invention

The present invention relates to an earth electrode apparatus and, more particularly, to an earth electrode apparatus for conductive contact of an earth electrode with a workpiece.

2. Description of the Related Art

In related art, direct spot welding or series welding is used for the welding of a workpiece made up of plate members laid one on top of the other. A large electric current is applied for a certain period to the workpiece sandwiched between a pair of weld electrodes while applying welding pressure thereto. A nugget is formed due to heat generated at a weld region, thereby welding the plate members together.

In spot welding of plate members in a structure such as an automobile body, there is no space for providing one of a pair of weld electrodes for direct spot welding or providing a back electrode for series welding, in some cases.

One-sided resistance spot welding, which enables a workpiece made up of plates stacked in layers to be welded from one side only, is used in such a case.

An example of one-sided resistance spot welding will now be explained with reference to FIG. 9. To weld a workpiece 100 made up of a second plate member 102 and a first plate member 101 laid on the second plate member 102 by using a one-sided resistance spot welding method, an earth electrode 106 is brought into contact with the second plate member 102 in a conductive manner; a weld electrode 105 is brought into contact with the surface of the first plate member 101 to apply welding pressure thereto. The first plate member 101 and the second plate member 102 are in contact with each other at a joint "a" in a conductive manner. A welding current application route X, which leads from the weld electrode 105 to the earth electrode 106 by way of the first plate member 101, the joint a, and the second plate member 102, is formed.

In the state in which the first plate member 101 is in conductive contact with the second plate member 102 at the joint a, a welding current "i" is applied from the weld electrode 105 to the earth electrode 106. A part "ia" of the welding current i flows through the welding current application route X. As a result, a part of each of the first plate member 101 and the second plate member 102 at the joint a melt to form into a nugget N. The welding current i flowing from the weld electrode 105 to the earth electrode 106 includes another part "ib". The another part ib flows, for example, through a current application route X1 leading from the first plate member 101 to the earth electrode 106 via an already-welded joint "b" and then via the second plate member 102 as a branch current without flowing through the joint a.

In such one-sided resistance spot welding, a copper plate that offers a relatively large area of contact with the second plate member 102 is generally used as the earth electrode 106, which is brought into conductive contact with the second plate member 102, to avoid heat generation due to conductive resistance between the second plate member 102 and the earth electrode 106. In actuality, however, when the earth electrode 106 made of a rigid copper plate is in contact with the second plate member 102 made of a steel plate, the second plate member 102 and the earth electrode 106 tend to be in a point-contact state, in which they are locally in contact because of, for example, variation in the contact angle of the earth electrode 106 with respect to the second plate member 102, or the surface irregularity of the second plate member 102. Due to point contact, current density is high at the region of contact. Heat generated at the region might melt and thus damage the second plate member 102 or the earth electrode 106 locally.

As illustrated in FIG. 10, in which the same numerals and symbols are assigned to members that are the same as those illustrated in FIG. 9 to omit the explanation thereof, if a commonly-used weld electrode is used as an earth electrode 107, the area of contact of the second plate member 102 and the earth electrode 107 is small. Therefore, current density is high at the region of contact. Heat generated at the region damages the second plate member 102 and increases the wear of the earth electrode 107.

As illustrated in FIG. 11, in which the same numerals and symbols are assigned to members that are the same as those illustrated in FIG. 9 to omit the explanation thereof, if an earth electrode 108 made of flexible braided copper wires is used to make the area of contact with the second plate member 102 large, it is possible to reduce current density at the region of contact, thereby preventing the second plate member 102 from being damaged due to melting. However, the earth electrode 108 is susceptible to deformation and wear. If the earth electrode 108 deforms or wears due to use, the area of contact of the second plate member 102 and the earth electrode 108 becomes smaller, which increases current density.

Moreover, if copper element wires of the earth electrode 108 become damaged, there is a risk that the damaged element wires might melt in contact with the second plate member 102 and become stuck thereto, which degrades the quality of the workpiece.

To provide a solution to the above problems, an earth connection apparatus that can secure the area of contact with a workpiece has been proposed in the art as disclosed in Japanese Unexamined Patent Application Publication No. 2004-136292. With reference to FIG. 12, the schematic structure of such an earth connection apparatus will now be explained.

An earth connection apparatus 110 includes a cylinder unit 112 attached to a robot arm 111, a bracket 115 fixed to a piston rod 113 extending downward from the cylinder unit 112 by means of nuts 114, cushion units 120 hanging from the left and right parts of the bracket 115 respectively, a pair of L-shaped metal clasps 116 each of which is attached to the lower end of the corresponding cushion unit 120, and an earth electrode 130 having the shape of a curved laminated spring. The ends of the earth electrode 130 are fixed to the respective L-shaped metal clasps 116 by means of bolts. The earth electrode 130 is made of a plurality of thin conductive strip plates stacked in layers. They have been embowed into the shape of a curved laminated spring in advance. An earth cable 131 is connected to the earth electrode 130.

The cushion unit 120 includes a flanged bush 121 inserted in the bracket 115 from above, a rod 122 inserted through the flanged bush 121 as a vertically-movable sliding rod, a male screw 123 integrally formed at the upper end of the rod 122, a stopper 124 fitted in the male screw 123, a nut 125 for fixing the stopper 124 to the rod 122, springs 126 arranged around the rod 122, a retainer 127 for supporting the lower end of the springs 126, an insulation bush 128 fitted in the L-shaped metal clasp 116 to receive the lower surface of the retainer 127, and a bolt 129 for fixing the L-shaped metal clasp 116 to the rod 122 through the insulation bush 128.

When an upward force that is greater in magnitude than the opposing force of the springs 126 is applied to the L-shaped metal clasp 116, the springs 126 are compressed. The rod 122 moves upward with respect to the bush 121 to raise the stopper 124 and the nut 125 away from the bush 121. Therefore, the L-shaped metal clasp 116 comes closer to the bracket 115.

The earth electrode 130 is positioned to face the surface of a workpiece by means of the robot arm 111. When the earth electrode 130 is brought into contact with, and pressed against, the workpiece, the earth electrode 130, which has the shape of a curved laminated spring, deforms according to the surface shape of the workpiece. In this way, the area of contact of the workpiece and the earth electrode 130 is secured, which makes it possible to reduce contact resistance, that is, conductive resistance, between the workpiece and the earth electrode 130.

To sum up, as an effect produced by the earth connection apparatus 110 disclosed in Japanese Unexamined Patent Application Publication No. 2004-136292, which includes the cylinder unit 112 attached to the robot arm 111 and further includes the curved-laminated-spring-type earth electrode 130 supported indirectly by the piston rod 113 extending downward from the cylinder unit 112 with the bracket 115 and the cushion units 120 provided therebetween, it is possible to cause the earth electrode 130 to deform according to the surface shape of a workpiece and thereby to secure the area of contact of the workpiece and the earth electrode 130 by positioning the earth electrode 130 face to face with the surface of the workpiece by means of the robot arm 111 and then bringing the earth electrode 130 into contact with, and pressing it against, the workpiece.

However, since the curved-laminated-spring-type earth electrode 130, which is fixed indirectly to the cushion units 120 at respective ends as if suspending therefrom with the respective L-shaped metal clasps 116 provided therebetween, is pressed against the surface of a workpiece to utilize its deformation for securing the area of contact, the earth electrode 130 has to be elongated and large. Besides, the earth connection apparatus 110 occupies a large space for operation. Therefore, a workpiece with which the earth electrode 130 is brought into contact and the shape thereof is limited.

Moreover, since the earth electrode 130 is pressed against the surface of a workpiece to utilize its deformation for securing the area of contact, a large load has to be applied for pressing. Furthermore, because of variation in the contact angle of the earth electrode 130 with respect to a workpiece, especially because of variation in the contact angle of the earth electrode 130 in the direction of the width thereof, the workpiece and the earth electrode 130 tend to be in a so-called line-contact state, in which the earth electrode 130 is in contact with the workpiece locally at its edge only. Due to line contact, current density is high at the region of contact. Therefore, the workpiece or the earth electrode 130 might be damaged locally due to heat generated at the region.

SUMMARY OF THE INVENTION

The invention is to provide an earth electrode apparatus that does not occupy much space, offers stable contact with a workpiece, and makes it possible to avoid local damage due to melting.

One aspect of the invention is an earth electrode apparatus for conductive contact of an earth electrode with a workpiece, including: a shaft supported by a base disposed opposite to the workpiece; a tiltable member having a pedestal and first, second, and third shanks, the pedestal being coupled to the shaft in a tiltable manner, the first, second, and third shanks protruding from the pedestal; and first, second, and third earth electrodes attached to ends of the first, second, and third shanks, respectively. All of the first, second, and third earth electrodes are brought into contact with the workpiece as a result of relative movement of the workpiece and/or the base closer to each other.

The structure of the earth electrode apparatus is simple and compact: a tiltable member having first, second, and third shanks to which first, second, and third earth electrodes can be attached respectively is coupled, in a tiltable manner, to a shaft supported by a base. Thus, the earth electrode apparatus does not occupy much space. If the surface of a workpiece is irregular or inclined, the tiltable member tilts for balancing with the workpiece to ensure equal contact pressure for the contact of the first, second, and third earth electrodes with the workpiece, thereby offering stable contact irrespective of surface irregularity or inclination. Since a welding current is split to flow into the first, second, and third earth electrodes through respective points of contact thereof with the workpiece, it is possible to reduce current density at each of the points of contact and to avoid heat generation ascribable to conductive resistance at each of the points of contact. Damage due to melting of the workpiece and the first, second, and third earth electrodes is prevented, which improves the quality of welding. The first, second, and third earth electrodes are less susceptible to wear.

Preferably, the shaft should include a shaft body having a base end fixed to the base, and a spherical part having a spherical surface formed at an end of the shaft body. The tiltable member should include the pedestal, a socket that extends from the pedestal and has a hemispherical or roughly hemispherical cavity formed inside the socket with an opening at an end, the spherical part being fitted in the cavity in such a way as to allow the cavity to slide along the spherical surface of the spherical part, and the first, second, and third shanks protruding from the pedestal in a direction away from the socket. The first, second, and third earth electrodes should be detachably attached to the ends of the first, second, and third shanks, respectively.

In such a preferred structure, the socket of the tiltable member having the first, second, and third shanks to which the first, second, and third earth electrodes can be attached respectively is coupled, in a tiltable manner, to the spherical part of the shaft. The socket of the tiltable member slides along the spherical part for the tilting of the tiltable member for balancing with the workpiece to ensure equal contact pressure for the contact of the first, second, and third earth electrodes with the workpiece, thereby offering stable contact. Since a welding current is split to flow into the first, second, and third earth electrodes through respective points of contact thereof with the workpiece, it is possible to reduce current density at each of the points of contact and to avoid heat generation ascribable to conductive resistance at each of the points of contact. Damage due to melting of the workpiece and the first, second, and third earth electrodes is prevented.

Moreover, since the first, second, and third earth electrodes are detachably attached to the ends of the first, second, and third shanks, respectively, depending on the degree of the wear or damage of any of the earth electrodes, it is possible to replace the worn-out or damaged electrode with new one independently, which simplifies maintenance and reduces running costs.

Another aspect of the invention is an earth electrode apparatus for conductive contact of an earth electrode with a workpiece, including: a shaft supported by a base disposed opposite to the workpiece; a tiltable shaft having a tiltable-shaft pedestal coupled to the base-supported shaft in a tiltable manner; a tiltable member having a tiltable-member pedestal and first, second, and third shanks, the tiltable-member pedestal being coupled to the tiltable shaft in a tiltable manner, the first, second, and third shanks protruding from the tiltable-member pedestal; and first, second, and third earth electrodes attached to ends of the first, second, and third shanks, respectively, wherein all of the first, second, and third earth electrodes are brought into contact with the workpiece as a result of relative movement of the workpiece and/or the base closer to each other.

The structure of the earth electrode apparatus is simple and compact: a tiltable shaft is coupled, in a tiltable manner, to a shaft supported by a base; a tiltable member having first, second, and third shanks to which first, second, and third earth electrodes can be attached respectively is coupled to the tiltable shaft in a tiltable manner. Thus, the earth electrode apparatus does not occupy much space. If the surface of a workpiece is irregular or inclined, the tiltable member tilts together with the tilting of the tiltable shaft without being restrained by the base-supported shaft for balancing with the workpiece to ensure equal contact pressure for the contact of the first, second, and third earth electrodes with the workpiece, thereby offering stable contact irrespective of surface irregularity or inclination. Since a welding current is split to flow into the first, second, and third earth electrodes through respective points of contact thereof with the workpiece, it is possible to reduce current density at each of the points of contact and to avoid heat generation ascribable to conductive resistance at each of the points of contact. Damage due to melting of the workpiece and the first, second, and third earth electrodes is prevented, which improves the quality of welding. The first, second, and third earth electrodes are less susceptible to wear.

Preferably, the base-supported shaft should include a shaft body having a base end fixed to the base, and a spherical part having a spherical surface formed at an end of the shaft body; the tiltable shaft should include a tiltable-shaft socket that extends from the tiltable-shaft pedestal and has a hemispherical or roughly hemispherical cavity formed inside the tiltable-shaft socket with an opening at an end, the spherical part of the base-supported shaft being fitted in the cavity of the tiltable shaft in such a way as to allow the cavity of the tiltable shaft to slide along the spherical surface of the spherical part of the base-supported shaft, and a tiltable-shaft body protruding from the tiltable-shaft pedestal in a direction away from the tiltable-shaft socket, a spherical part with a spherical surface being formed at an end of the tiltable-shaft body; the tiltable member should include a tiltable-member socket that extends from the tiltable-member pedestal and has a hemispherical or roughly hemispherical cavity formed inside the tiltable-member socket with an opening at an end, the spherical part of the tiltable shaft being fitted in the cavity of the tiltable member in such a way as to allow the cavity of the tiltable member to slide along the spherical surface of the spherical part of the tiltable shaft, and the first, second, and third shanks protruding from the tiltable-member pedestal in a direction away from the tiltable-member socket; and the first, second, and third earth electrodes should be detachably attached to the ends of the first, second, and third shanks, respectively.

In such a preferred structure, the socket of the tiltable shaft having the spherical part is coupled to the spherical part of the base-supported shaft in a tiltable manner. The socket of the tiltable member having the first, second, and third shanks to which the first, second, and third earth electrodes can be attached respectively is coupled, in a tiltable manner, to the spherical part of the tiltable shaft. The socket of the tiltable member slides along the spherical part for the tilting of the tiltable member for balancing with the workpiece to ensure equal contact pressure for the contact of the first, second, and third earth electrodes with the workpiece, thereby offering stable contact. Since a welding current is split to flow into the first, second, and third earth electrodes through respective points of contact thereof with the workpiece, it is possible to reduce current density at each of the points of contact and to avoid heat generation ascribable to conductive resistance at each of the points of contact. Damage due to melting of the workpiece and the first, second, and third earth electrodes is prevented.

Moreover, since the first, second, and third earth electrodes are detachably attached to the ends of the first, second, and third shanks, respectively, depending on the degree of the wear or damage of any of the earth electrodes, it is possible to replace the worn-out or damaged electrode with new one independently, which simplifies maintenance and reduces running costs.

Preferably, the earth electrode apparatus should further include tiltable member supporting unit for urging the tiltable member to a preset position with respect to the base-supported shaft.

With such a preferred structure, the socket of the tiltable member slides along the spherical part for the tilting of the tiltable member for balancing with the workpiece to ensure equal contact pressure for the contact of the first, second, and third earth electrodes with the workpiece, thereby offering greater stability.

Preferably, each of the shanks should have a tapered conical earth electrode attachment part at an end side. Each of the earth electrodes should include a hemispherical top part and a cylindrical base part that are formed integrally, have a tapered hole in which the electrode attachment part can be fitted, and have a cylindrical shape with a bottom.

With such a preferred structure, a commonly-used weld electrode can be adopted for each of the earth electrodes. Thus, it is possible to simplify maintenance and reduce running costs.

Preferably, a coolant reservoir should be formed between the end of each of the shanks and a bottom of the tapered hole of the corresponding one of the earth electrodes when the earth electrode attachment part of each of the shanks is fitted in the tapered hole of the corresponding one of the earth electrodes for attachment.

Since each of the earth electrodes is cooled by means of a circulatory coolant, it is possible to avoid the first, second, and third earth electrodes from being damaged due to melting and avoid heat adhesion of the workpiece and each of the earth electrodes.

Advantageously, the earth electrode apparatus has a simple and compact structure in which the tiltable member having the first, second, and third shanks to which the first, second, and third earth electrodes can be attached respectively is coupled, in a tiltable manner, either to the shaft supported by the base or to the tiltable shaft and thus indirectly to the shaft supported by the base. If the surface of a workpiece is irregular or inclined, the tiltable member tilts for balancing with the workpiece to ensure equal contact pressure for the contact of the first, second, and third earth electrodes with the workpiece, thereby offering stable contact irrespective of surface irregularity or inclination. Since a welding current is split to flow into the first, second, and third earth electrodes through respective points of contact thereof with the workpiece, it is possible to reduce current density at each of the points of contact and to avoid heat generation ascribable to conductive resistance at each of the points of contact. Damage due to melting of the workpiece and the first, second, and third earth electrodes is prevented.

BRIEF DESCRIPTION OF THE DRAWINGS

FIG. 2 is an exploded perspective view illustrating essential components of the earth electrode apparatus;

FIG. 5 is a diagram illustrating the overall structure of an earth electrode apparatus according to a second embodiment of the invention;

FIG. 6A is a fragmentary view corresponding to FIG. 5, the view being taken in the direction of an arrow VIA illustrated therein;

FIG. 6B is a sectional view taken along the line VIB-VIB of FIG. 6A;

DESCRIPTION OF THE PREFERRED EMBODIMENTS

A earth electrode apparatuses according to exemplary embodiments of the invention, which are applied to one-sided resistance spot welding for the purpose of explanation, will now be explained.

First Embodiment

Figure 1:
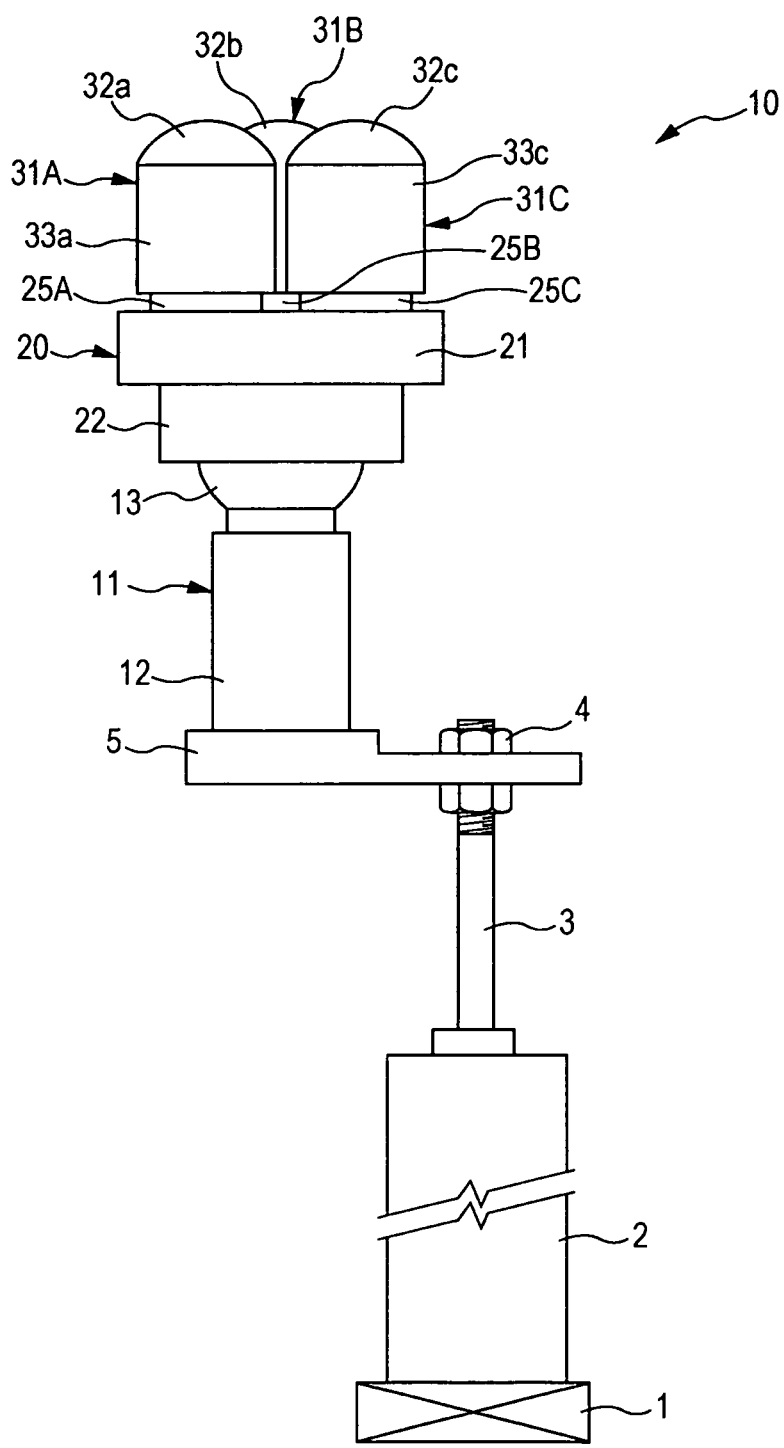
FIG. 1 is a diagram illustrating the overall structure of an earth electrode apparatus according to a first embodiment of the invention.

A first embodiment of the invention will now be explained with reference to FIGS. 1 to 4. FIG. 1 is a diagram illustrating the overall structure of an earth electrode apparatus according to an exemplary embodiment of the invention. An earth electrode assembly 10 is attached to a base 5 that is attached to the tip of a cylinder rod 3 by means of nuts 4. The cylinder rod 3 extends from a cylinder unit 2 attached to a robot arm 1.

The earth electrode apparatus 10 includes a shaft 11, a cradle 20, a first earth electrode 31A, a second earth electrode 31B, and a third earth electrode 31C. The shaft 11 is attached to the base 5 in an electrically insulated state. The cradle 20 is coupled to the shaft 11 as a freely tiltable member. The first earth electrode 31A, the second earth electrode 31B, and the third earth electrode 31C are detachably attached to a first shank 25A, a second shank 25B, and a third shank 25C that are formed on the cradle 20, respectively.

Figure 3A:
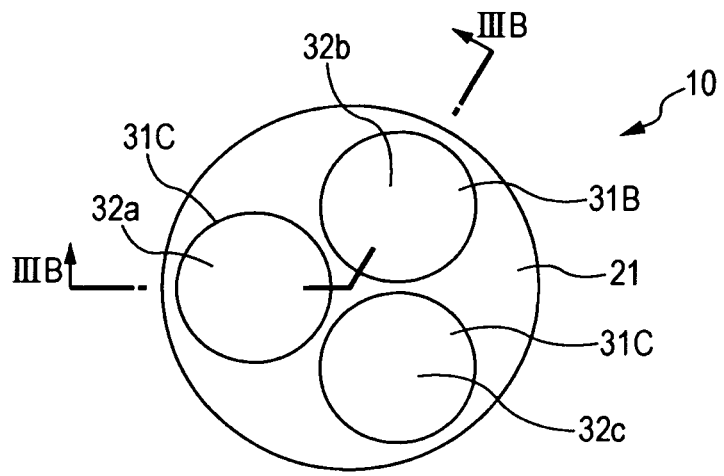
FIG. 3A is a fragmentary view corresponding to FIG. 2, the view being taken in the direction of an arrow IIIA illustrated therein.
Figure 3B:
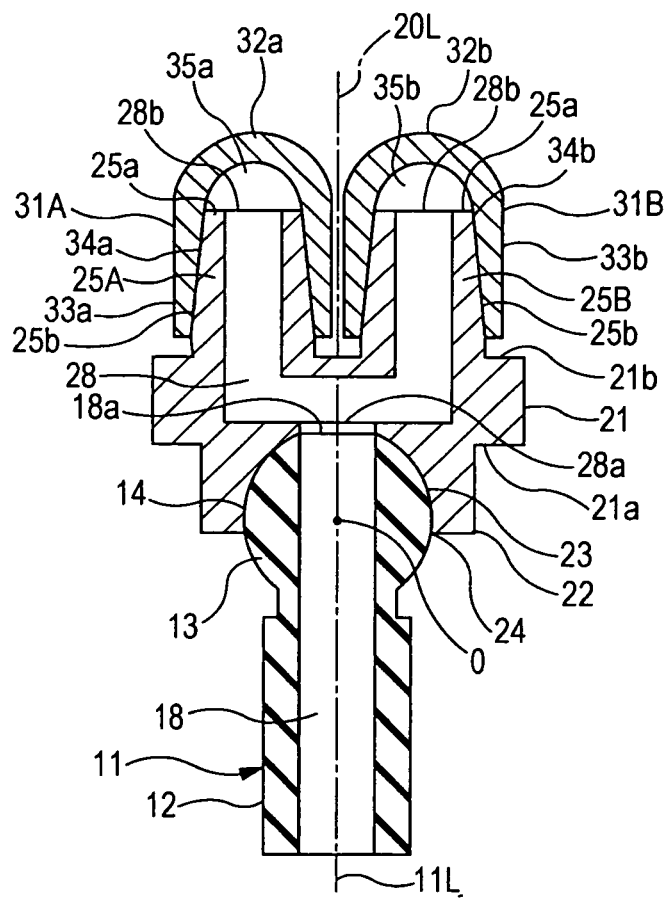
FIG. 3B is a sectional view taken along the line IIIB-IIIB of FIG. 3A.

FIG. 2 is an exploded perspective view illustrating essential components of the earth electrode apparatus 10, specifically, the shaft 11, the cradle 20, and the earth electrodes 31A, 31B, and 31C. FIG. 3A is a fragmentary view corresponding to FIG. 2. The view is taken in the direction of an arrow IIIA illustrated therein. FIG. 3B is a sectional view taken along the line IIIB-IIIB of FIG. 3A.

The shaft 11 includes a shaft body 12 and a spherical head 13. The base end of the shaft body 12, which has a cylindrical shape, is fixed to the base 5. The spherical head 13 is integrally formed at the tip of the shaft body 12 and has a surface 14 that is ball-shaped. A coolant passage 18 leading from the base end of the shaft body 12 to the top of the spherical head 13 is formed inside the shaft 11 along its central axis 11L. The coolant passage 18 has an opening 18a at the top of the spherical surface 14. The opposite base end of the coolant passage 18 is in communication with an unillustrated coolant supply source through the base 5.

An earth cable 16 is connected to the shaft body 12.

The cradle 20 includes a disc-shaped pedestal 21 having its center on the central axis 20L. A cylindrical socket 22 extends along the central axis 20L from one surface 21a of the pedestal 21. A concave surface 23 that has a roughly hemispherical shape is formed inside the socket 22. The spherical head 13 of the shaft 11 is fitted in the hemispherical cavity 23 in such a way as to allow the pedestal 21 to tilt. The hemispherical cavity 23 has an opening 24 at an end.

Three shanks, that is, the first, second, and third shanks 25A, 25B, and 25C, each of which has a roughly cylindrical shape (truncated cone), are formed as protruding parts on the other surface 21b of the disc-shaped pedestal 21, that is, at the side opposite the socket side. The shanks 25A, 25B, and 25C are formed at equal spaces around the central axis 20L. The shanks 25A, 25B, and 25C extend away from the socket 22. The extending direction is parallel to the central axis 20L.

The shanks 25A, 25B, and 25C are identically shaped. Each of the shanks has a tapered electrode attachment part 25b. The tapered electrode attachment part 25b has a proximal end that is continuous from the body 21 and an outer diameter that decreases gradually toward its truncated end 25a.

A coolant passage 28 having openings 28a and 28b is formed inside the cradle 20. The opening 28a is formed on the central axis 20L at the bottom of the cavity of the socket 22. The opening 28b is formed at the truncated end 25a of each of the shanks 25A, 25B, and 25C. The coolant passage 28, which leads from the opening 28a to the openings 28b, branches into three sub passages inside the body 21 and goes through the inside of the shanks 25A, 25B, and 25C.

To couple the shaft 11 and the cradle 20 together, the spherical head 13 of the shaft 11 is pressed into or fitted into the hemispherical cavity 23 of the socket 22 through the opening 24. As may be necessary, the opening 24 of the socket 22 is caulked to couple the shaft 11 and the cradle 20 together. Therefore, the spherical head 13 is fitted therein in such a way as to allow the surface of the hemispherical cavity 23 of the socket 22 to slide along the spherical surface 14 of the spherical head 13 around the center O of the spherical head 13. The opening 18a of the coolant passage 18, which is formed inside the shaft 11, and the opening 28a of the coolant passage 28, which is formed inside the cradle 20, face each other and communicate with each other.

The first, second, and third earth electrodes 31A, 31B, and 31C are detachably attached to the first, second, and third shanks 25A, 25B, and 25C of the cradle 20, respectively.

The first earth electrode 31A has a hemispherical top part 32a and a base part 33a that are formed integrally. A tapered hole 34a that has a diameter that decreases toward the top part 32a is formed inside the first earth electrode 31A. Therefore, the first earth electrode 31A has a cylindrical shape with a bottom or a cap-like shape. The electrode attachment part 25b of the first shank 25A is press-fitted into the tapered hole 34a when the first earth electrode 31A is attached to the first shank 25A. In such a press-fitted state, the bottom of the tapered hole 34a is not in contact with the truncated end 25a of the first shank 25A. Therefore, an inner space between the bottom of the tapered hole 34a and the truncated end 25a of the first shank 25A is formed as a coolant reservoir 35a. The coolant reservoir 35a is in communication with the coolant passage 28.

In like manner, the second earth electrode 31B has a hemispherical top part 32b and a cylindrical base part 33b that are formed integrally. A tapered hole 34b is formed inside the second earth electrode 31B. The second earth electrode 31B has a cylindrical shape with a bottom or a cap-like shape. The electrode attachment part 25b of the second shank 25B is press-fitted into the tapered hole 34b when the second earth electrode 31B is attached to the second shank 25B.

The third earth electrode 31C has a hemispherical top part 32c and a cylindrical base part 33c that are formed integrally. A tapered hole 34c is formed inside the third earth electrode 31C. The third earth electrode 31C has a cylindrical shape with a bottom or a cap-like shape. The electrode attachment part 25b of the third shank 25C is press-fitted into the tapered hole 34c when the third earth electrode 31C is attached to the third shank 25C. The structures of the first, second, and third earth electrodes 31A, 31B, and 31C are identical. Although not explained in detail, coolant reservoirs 35b and 35c that are in communication with the coolant passage 28 are formed inside the second and third earth electrodes 31B and 31C, respectively.

A commonly-used electrode tip for welding can be used for each of the first, second, and third earth electrodes 31A, 31B, and 31C.

Next, the operation of the earth electrode apparatus 10 will now be explained with reference to FIG. 4.

Figure 4A:
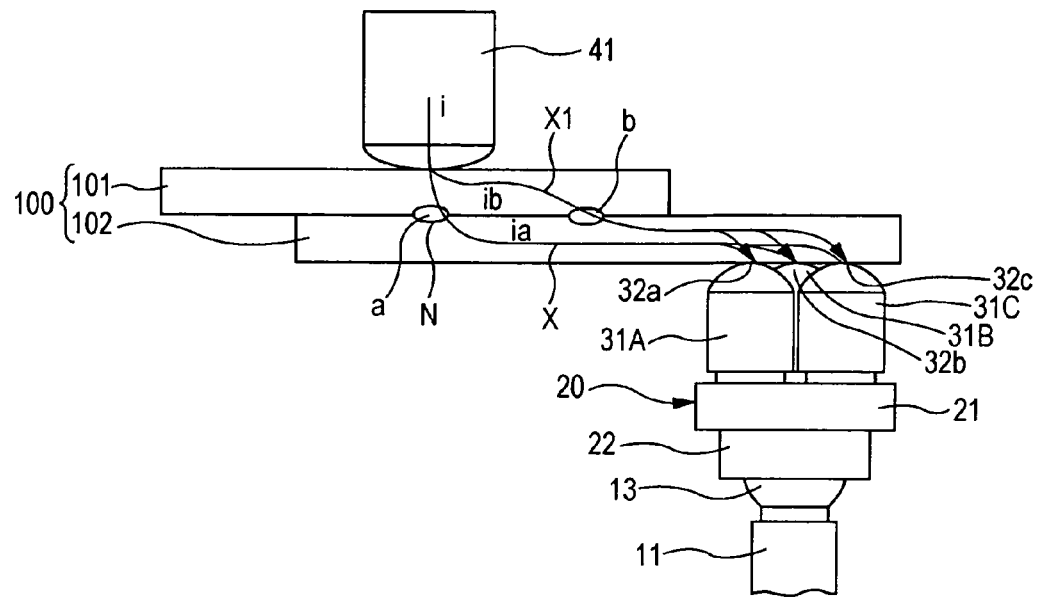
FIG. 4A is an operation diagram.

For example, a workpiece 100 illustrated in FIG. 4A, which is made up of a second plate member 102 and a first plate member 101 laid on the second plate member 102, is welded by using a one-sided resistance spot welding method as follows. The earth electrode assembly 10 is moved by means of the robot arm 1 to make the respective top parts 32a, 32b, and 32c of the earth electrodes 31A, 31B, and 31C face a preset earth electrode contact region of the second plate member 102 by positioning them opposite to the region.

Then, the cylinder unit 2 is operated to move the base 5 closer to the second plate member 102, thereby moving the earth electrode assembly 10 closer to the second plate member 102. The respective top parts 32a, 32b, and 32c of the earth electrodes 31A, 31B, and 31C are brought into contact with, and pressed against, the second plate member 102.

When the first, second, and third earth electrodes 31A, 31B, and 31C are in pressure contact with the second plate member 102, an opposing force is exerted on each of the respective top parts 32a, 32b, and 32c of the earth electrodes 31A, 31B, and 31C from the second plate member 102.

Supposing that opposing forces exerted on each of the respective top parts 32a, 32b, and 32c of the earth electrodes 31A, 31B, and 31C from the second plate member 102 are not equal due to a reason attributable to the shape of the surface of the second plate member 102, for example, surface irregularity, a force for angular movement is exerted on the body 21 of the cradle 20 through the shanks 25A, 25B, and 25C according to inequality in the opposing forces exerted on the respective top parts 32a, 32b, and 32c of the earth electrodes 31A, 31B, and 31C. The hemispherical cavity 23, in which the spherical head 13 is fitted in such a way as to allow the body 21 to tilt, slides along the spherical surface 14 of the spherical head 13 to balance the opposing forces exerted on the earth electrodes 31A, 31B, and 31C, which means that the cradle 20 moves around the center O of the spherical head 13 in a tilting manner. In other words, the cradle 20 tilts around the center O of the spherical head 13 according to the surface shape of the second plate member 102. Therefore, the respective top parts 32a, 32b, and 32c of the earth electrodes 31A, 31B, and 31C are in conductive contact with the second plate member 102 with an equal pressing force.

In the state in which the first, second, and third earth electrodes 31A, 31B, and 31C are in contact with the second plate member 102, a coolant is supplied in a circulatory manner from the coolant supply source to each of the coolant reservoirs 35a, 35b, and 35c, that is, an inner space between the truncated end 25a, 25b, 25c of the shank 25A, 25B, 25C and the bottom of the tapered hole 34a, 34b, 34c of the earth electrode 31A, 31B, 31C, through the coolant passage 18 of the shaft 11 and the coolant passage 28 of the cradle 20 to cool each of the earth electrodes 31A, 31B, and 31C.

A weld electrode 41 is brought into contact with the first plate member 101 at a preset spot position to apply welding pressure thereto. The first plate member 101, to which the welding pressure is applied by the weld electrode 41, and the second plate member 102 are in contact with each other at a joint "a" in a conductive manner. A welding current application route X is formed that leads from the weld electrode 41 to each of the first, second, and third earth electrodes 31A, 31B, and 31C by way of the first plate member 101, the joint a between the first plate member 101 and the second plate member 102, the second plate member 102, and the corresponding point of contact of the earth electrode 31A, 31B, 31C and the second plate member 102.

In the state in which the first plate member 101 is in conductive contact with the second plate member 102 at the joint a and, in addition, each of the first, second, and third earth electrodes 31A, 31B, and 31C is in conductive contact with the second plate member 102, a welding current "i" supplied from a welding source is applied from the weld electrode 41 to the earth cable 16 of the earth electrode apparatus 10. A part "ia" of the welding current i flows through the welding current application route X, which goes through the joint a between the first plate member 101 and the second plate member 102, the second plate member 102, and the corresponding point of contact of each of the earth electrodes 31A, 31B, and 31C and the second plate member 102. As a result, a part of each of the first plate member 101 and the second plate member 102 at the joint a melt to form into a nugget N.

The welding current i flowing from the weld electrode 41 to the first, second, and third earth electrodes 31A, 31B, and 31C includes another part "ib". The another part ib flows, for example, through a current application route X1 leading from the first plate member 101 to each of the earth electrodes 31A, 31B, and 31C via an already-welded joint "b", the second plate member 102, and the corresponding point of contact as a branch current without flowing through the joint a between the first plate member 101 and the second plate member 102. The branch current ib is a reactive current whose contribution to heat generation at the joint a is almost zero.

Figure 4B:
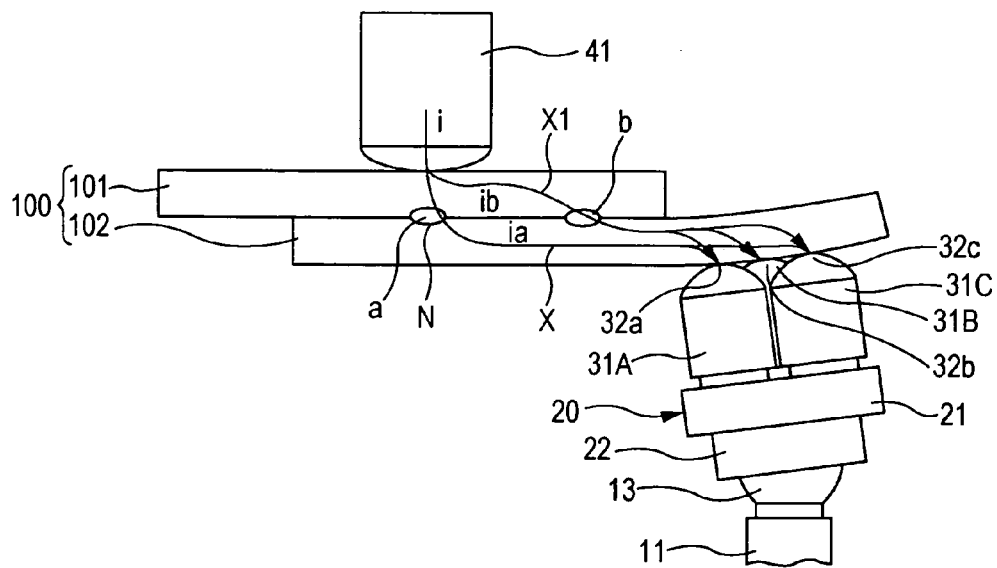
FIG. 4B is an operation diagram.

Supposing that upon the one-sided resistance spot welding of the workpiece 100, which is made up of the second plate member 102 and the first plate member 101 laid on the second plate member 102, as illustrated in FIG. 4B, the earth electrode contact region of the second plate member 102 is inclined and thus not perpendicular to the extending direction of the cylinder unit 2, or in other words, not perpendicular to the central axis 11L of the shaft 11, the earth electrode assembly 10 is moved by means of the robot arm 1 to make the respective top parts 32a, 32b, and 32c of the earth electrodes 31A, 31B, and 31C face the earth electrode contact region of the second plate member 102 by positioning them opposite thereto.

Then, the cylinder unit 2 is operated to move the earth electrode assembly 10 closer to the second plate member 102 by movement force transmission via the base 5. Since the earth electrode contact region is inclined, one of the top parts 32a, 32b, and 32c of the first, second, and third earth electrodes 31A, 31B, and 31C, for example, the top part 32a of the first earth electrode 31A, is brought into contact with the second plate member 102. When the earth electrode assembly 10 is moved further for pressure contact with the second plate member 102, an opposing force is exerted on the top part 32a of the first earth electrode 31A from the second plate member 102.

Due to the opposing force exerted on the top part 32a of the first earth electrode 31A from the second plate member 102, a biased opposing force that is decentered from the central axis 20L of the cradle 20 is exerted. The hemispherical cavity 23, in which the spherical head 13 is fitted in such a way as to allow the body 21 to tilt, slides along the spherical surface 14 of the spherical head 13. That is, the cradle 20 moves around the center O of the spherical head 13 in a tilting manner. During the tilting operation, the top part 32a of the first earth electrode 31A is maintained in pressure contact with the second plate member 102. As a result, the top part 32b of the second earth electrode 31B and top part 32c of the third earth electrode 31C are brought into contact with the second plate member 102.

When the first, second, and third earth electrodes 31A, 31B, and 31C are in pressure contact with the second plate member 102, an opposing force is exerted on each of the respective top parts 32a, 32b, and 32c of the earth electrodes 31A, 31B, and 31C from the second plate member 102. Urged through the shanks 25A, 25B, and 25C according to inequality in the opposing forces exerted on the respective top parts 32a, 32b, and 32c of the earth electrodes 31A, 31B, and 31C, the cradle 20 moves around the center O of the spherical head 13 in a tilting manner when the hemispherical cavity 23, in which the spherical head 13 is fitted in such a way as to allow the body 21 to tilt, slides along the spherical surface 14 of the spherical head 13 to balance the opposing forces exerted on the earth electrodes 31A, 31B, and 31C.

In other words, the cradle 20 tilts around the center O of the spherical head 13 for balancing with the second plate member 102 to ensure equal contact pressure for the conductive contact of the respective top parts 32a, 32b, and 32c of the earth electrodes 31A, 31B, and 31C with the second plate member 102.

In the state in which the first, second, and third earth electrodes 31A, 31B, and 31C are in contact with the second plate member 102, a coolant is supplied in a circulatory manner from the coolant supply source to each of the coolant reservoirs 35a, 35b, and 35c, that is, an inner space between the truncated end 25a, 25b, 25c of the shank 25A, 25B, 25C and the bottom of the tapered hole 34a, 34b, 34c of the earth electrode 31A, 31B, 31C, through the coolant passage 18 of the shaft 11 and the coolant passage 28 of the cradle 20 to cool each of the earth electrodes 31A, 31B, and 31C.

The weld electrode 41 is brought into contact with the first plate member 101 at a preset spot position to apply welding pressure thereto. The first plate member 101, to which the welding pressure is applied by the weld electrode 41, and the second plate member 102 are in contact with each other at the joint a in a conductive manner. The welding current application route X is formed that leads from the weld electrode 41 to each of the first, second, and third earth electrodes 31A, 31B, and 31C by way of the first plate member 101, the joint a between the first plate member 101 and the second plate member 102, the second plate member 102, and the corresponding point of contact of the earth electrode 31A, 31B, 31C and the second plate member 102.

In the state in which the first plate member 101 is in conductive contact with the second plate member 102 at the joint a and, in addition, each of the first, second, and third earth electrodes 31A, 31B, and 31C is in conductive contact with the second plate member 102 at the corresponding point of contact, the welding current i supplied from the welding source is applied from the weld electrode 41 to the earth cable 16 of the earth electrode apparatus 10. A part is of the welding current i flows through the welding current application route X, which goes through the joint a between the first plate member 101 and the second plate member 102, the second plate member 102, and the corresponding point of contact of each of the earth electrodes 31A, 31B, and 31C and the second plate member 102. As a result, a part of each of the first plate member 101 and the second plate member 102 at the joint a melt to form into the nugget N.

Another part ib of the welding current i from the weld electrode 41 to the first, second, and third earth electrodes 31A, 31B, and 31C flows, for example, through the current application route X1 leading from the first plate member 101 to each of the earth electrodes 31A, 31B, and 31C via the already-welded joint b, the second plate member 102, and the corresponding point of contact as a branch current without flowing through the joint a between the first plate member 101 and the second plate member 102.

Therefore, the earth electrode apparatus 10 has a simple and compact structure in which the spherical head 13 of the shaft 11 supported indirectly by the cylinder unit 2 is coupled to the cradle 20 having the first, second, and third shanks 25A, 25B, and 25C, to which the first, second, and third earth electrodes 31A, 31B, and 31C are attached, respectively, in such a way that the cradle 20 can tilt. Thus, the earth electrode apparatus 10 does not occupy much space. In addition, if the surface of the earth electrode contact region 102a of the second plate member 102 is irregular or inclined, the cradle 20 tilts for balancing with the earth electrode contact region 102a to ensure equal contact pressure for the contact of the respective top parts 32a, 32b, and 32c of the earth electrodes 31A, 31B, and 31C with the second plate member 102. Therefore, irrespective of surface irregularity or inclination, the contact of the respective top parts 32a, 32b, and 32c of the earth electrodes 31A, 31B, and 31C with the second plate member 102 is stable. A large area of contact with the second plate member 102, which is the sum of areas of contact at three points between the second plate member 102 and the respective earth electrodes 31A, 31B, and 31C, is secured.

Moreover, since the welding current i is split to flow into the first, second, and third earth electrodes 31A, 31B, and 31C through respective points of contact, it is possible to reduce current density at each of the points of contact and to avoid heat generation ascribable to conductive resistance at each of the points of contact. With such a reduction in current density combined with the cooling of the earth electrodes 31A, 31B, and 31C by using the circulatory coolant, it is possible to avoid the second plate member 102 and the earth electrodes 31A, 31B, and 31C from being damaged locally due to melting.

Moreover, the heat adhesion of the second plate member 102 and the earth electrodes 31A, 31B, and 31C is far less likely to occur. Since welded members-such as the second plate member 102 are substantially free from damage, the quality of welding improves. In addition, the earth electrodes 31A, 31B, and 31C are substantially free from damage.

Furthermore, since heat at the first, second, and third earth electrodes 31A, 31B, and 31C is moderate, it does not increase the wear of the earth electrodes 31A, 31B, and 31C.

Furthermore, depending on the degree of the wear of any earth electrode 31A, 31B, 31C or the degree of the damage thereof, it is possible to replace the worn-out or damaged electrode with new one independently, that is, without any need to replace the other electrodes that are still usable at the same time. In addition, commonly-used weld electrodes can be adopted for use with the earth electrode apparatus disclosed herein. Such independent electrode replacement, when combined with use of commonly-used electrodes, makes it possible to simplify maintenance and reduce running costs.

Second Embodiment

A second embodiment of the invention will now be explained with reference to FIGS. 5 to 8. FIG. 5 is a diagram illustrating the overall structure of an earth electrode apparatus 50. FIG. 6A is a fragmentary view corresponding to FIG. 5. The view is taken in the direction of an arrow VIA illustrated therein. FIG. 6B is a sectional view taken along the line VIB-VIB of FIG. 5A.

The earth electrode assembly 50 is attached to the base 5, which is attached to the tip of a cylinder rod extending from a cylinder unit attached to a robot arm as in the structure according to the first embodiment of the invention.

The earth electrode apparatus 50 includes an attachment pedestal 51, a fixed shaft 61, a tiltable shaft member 70, a cradle 80, a first earth electrode 91A, a second earth electrode 91B, and a third earth electrode 91C. The attachment pedestal 51 is attached to the base 5 in an electrically insulated state. The shaft 61 is fixed to the attachment pedestal 51. The shaft member 70 is coupled to the shaft 61 as a freely tiltable member. The cradle 80 is coupled to the tiltable shaft member 70 as another freely tiltable member. The first earth electrode 91A, the second earth electrode 91B, and the third earth electrode 91C are detachably attached to a first shank 85A, a second shank 85B, a third shank 85C that are formed on the cradle 80, respectively.

The attachment pedestal 51 attached to the base 5 has the shape of a hollow cylinder having a circumferential wall 52 and a top wall 53. An unillustrated earth cable is connected to the attachment pedestal 51.

The shaft 61 includes a shaft body 62 and a spherical head 63. The base end of the shaft body 62, which has a cylindrical shape, is fixed to the top wall 53 of the attachment pedestal 51. The spherical head 63 is integrally formed at the tip of the shaft body 62 and has a ball-shaped surface 64. A coolant passage 68 leading from the base end of the shaft body 62 to the top of the spherical head 63 is formed inside the shaft 61 along its central axis 61L. The base end of the coolant passage 68 is in communication with an unillustrated coolant supply source through the attachment pedestal 51.

The tiltable shaft member 70 includes a hollow cylindrical pedestal 71 having its center on the central axis 70L. A cylindrical socket 72 extends along the central axis 70L from the base-end-side surface of the pedestal 71. A concave surface 73 that has a roughly hemispherical shape is formed inside the socket 72. The spherical head 63 of the shaft 61 is fitted in the hemispherical cavity 73 in such a way as to allow the pedestal 71 to tilt. The hemispherical cavity 73 has an opening 74 at an end. A shaft body 75 is fixed to the tip-side surface of the pedestal 71, that is, at the side opposite the socket side. A spherical head 76 having a ball-shaped surface 77 is integrally formed at the tip of the shaft body 75. A coolant passage 78 leading from the base end of the shaft body 75 to the top of the spherical head 76 is formed inside the tiltable shaft member 70.

The cradle 80 includes a disc-shaped pedestal 81 having its center on the central axis 80L. A cylindrical socket 82 extends along the central axis 80L from one surface of the pedestal 81. A concave surface 83 that has a roughly hemispherical shape is formed inside the socket 82. The spherical head 76 of the tiltable shaft member 70 is fitted in the hemispherical cavity 83 in such a way as to allow the pedestal 81 to tilt. The hemispherical cavity 83 has an opening 84 at an end. Three shanks, that is, the first, second, and third shanks 85A, 85B, and 85C, each of which has a roughly cylindrical shape (truncated cone), are formed as protruding parts on the other surface of the pedestal 81, that is, at the side opposite the socket side. The shanks 85A, 85B, and 85C are formed at equal spaces around the central axis 80L. The shanks 85A, 85B, and 85C extend away from the socket 82. The extending direction is parallel to the central axis 80L. The shanks 85A, 85B, and 85C are identically shaped. Each of them has a tapered electrode attachment part 85b. The tapered electrode attachment part 25b has a proximal end that is continuous from the pedestal 81 has an outer diameter that decreases gradually toward its truncated end.

A coolant passage 88 having an opening at one end and openings at the other end is formed inside the cradle 80. The first-mentioned opening is formed on the central axis 80L at the bottom of the cavity of the socket 82. The second-mentioned opening is formed at the truncated end of each of the shanks 85A, 85B, and 85C. The coolant passage 88, which leads from the first-mentioned opening to the second-mentioned openings, branches into three sub passages inside the body 81 and goes through the inside of the shanks 85A, 85B, and 85C.

To couple the shaft 61 and the tiltable shaft member 70 together, the spherical head 63 of the shaft 61 is pressed into or fitted into the hemispherical cavity 73 of the socket 72 through the opening 74. As may be necessary, the opening 74 of the socket 72 is caulked to couple the shaft 61 and the tiltable shaft member 70 together. Therefore, the spherical head 63 is fitted therein in such a way as to allow the surface of the hemispherical cavity 73 of the socket 72 to slide along the spherical surface 64 of the spherical head 63 around the center O1 of the spherical head 63. The coolant passage 68 formed inside the shaft 61 is in communication with the coolant passage 78 formed inside the tiltable shaft member 70.

In like manner, to couple the tiltable shaft member 70 and the cradle 80 together, the spherical head 76 of the tiltable shaft member 70 is pressed into or fitted into the hemispherical cavity 83 of the socket 82 through the opening 84. As may be necessary, the opening 84 of the socket 82 is caulked to couple the tiltable shaft member 70 and the cradle 80 together. Therefore, the spherical head 76 is freely fitted therein in such a way as to allow the surface of the hemispherical cavity 83 of the socket 82 to slide along the spherical surface 77 of the spherical head 76 around the center O2 of the spherical head 76. The coolant passage 78 formed inside the tiltable shaft member 70 is in communication with the coolant passage 88 formed inside the cradle 80.

The first, second, and third earth electrodes 91A, 91B, and 91C are detachably attached to the first, second, and third shanks 85A, 85B, and 85C of the cradle 80, respectively.

The first earth electrode 91A has a top part 92a and a base part 93a that are formed integrally. A tapered hole 94a that has a diameter that decreases toward the top part 92a is formed inside the first earth electrode 91A. Therefore, the first earth electrode 91A has a cylindrical shape with a bottom or a cap-like shape. The electrode attachment part 85b of the first shank 85A is press-fitted into the tapered hole 94a when the first earth electrode 91A is attached to the first shank 85A. In such a press-fitted state, the bottom of the tapered hole 94a is not in contact with the truncated end of the first shank 85A. Therefore, an inner space between the bottom of the tapered hole 94a and the truncated end of the first shank 85A is formed as a coolant reservoir 96. The coolant reservoir 96 is in communication with the coolant passage 88. Since the structure of each of the second earth electrode 91B and the third earth electrode 91C is the same as that of the first earth electrode 91A, it is not explained in detail here. A commonly-used electrode tip for welding can be used for each of the first, second, and third earth electrodes 91A, 91B, and 91C.

In addition to the above components, the earth electrode apparatus 50 includes a tiltable member supporting unit for urging the cradle 80 to a preset position where the central axis 80L of the cradle 80 is on the extension of the central axis L1 of the shaft 61, or in other words, a position for stretching a combination of the tiltable shaft member 70 and the cradle 80 in a straight line from the shaft 61. As illustrated in FIGS. 5 and 6, in the present embodiment of the invention, a flexible tube 95 in which a coil spring for elastic recovery is provided is used as the tiltable member supporting unit. More specifically, one end 95a of the flexible tube 95 is fixed to the circumferential wall 52 of the attachment pedestal 51, whereas the other end 95b thereof is fixed to the pedestal 81 of the cradle 80. In addition, the middle of the flexible tube 95 is fixed to the pedestal 71 of the tiltable shaft member 70. Alternatively, a component such as a coil spring may be elastically disposed as the tiltable member supporting unit between the attachment pedestal 51 and the pedestal 81 of the cradle 80.

Figure 7:
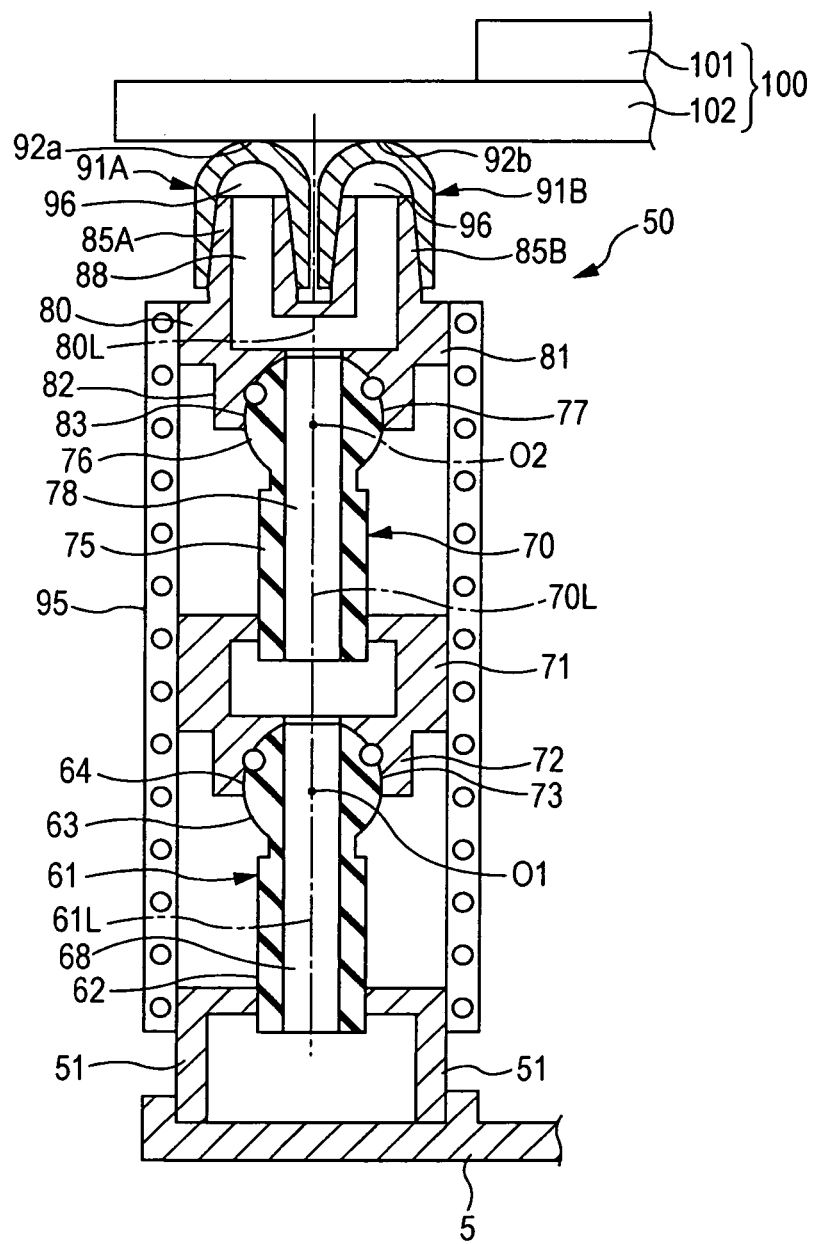
FIG. 7 is an operation diagram.

Next, the operation of the earth electrode apparatus 50 will now be explained with reference to FIGS. 7 and 8.

For example, the workpiece 100 illustrated in FIG. 7, which is made up of the second plate member 102 and the first plate member 101 laid on the second plate member 102, is welded by using a one-sided resistance spot welding method as follows. The earth electrode assembly 50 is moved by means of the robot arm via the base 5 to make the respective top parts 92a, 92b, and 92c of the earth electrodes 91A, 91B, and 91C face a preset earth electrode contact region of the second plate member 102 by positioning them opposite to the region.

Then, the base 5 is moved closer to the second plate member 102. Thus, the earth electrode assembly 50 is moved closer to the second plate member 102. The respective top parts 92a, 92b, and 92c of the earth electrodes 91A, 91B, and 91C are brought into contact with, and pressed against, the second plate member 102.

To bring the respective top parts 92a, 92b, and 92c of the earth electrodes 91A, 91B, and 91C into pressure contact with the second plate member 102 efficiently, the tiltable member supporting unit, that is, the flexible tube 95, restrains the inter-tilting of the shaft 61, the tiltable shaft member 70, and the cradle 80, that is, the falling-out-of-line movement of the tiltable shaft member 70 and the cradle 80 relative to the shaft 61. With such elastic support by the flexible tube 95, which holds the central axis 61L of the shaft 61, the central axis 70L of the tiltable shaft member 70, and the central axis 80L of the cradle 80 aligned in a welding pressure application direction, that is, in a direction in which the base 5 approaches the workpiece 100, welding pressure is transmitted to the cradle 80 through the attachment pedestal 51, the shaft 61, and the tiltable shaft member 70.

When the first, second, and third earth electrodes 91A, 91B, and 91C are in pressure contact with the second plate member 102, an opposing force is exerted on each of the respective top parts 92a, 92b, and 92c of the earth electrodes 91A, 91B, and 91C from the second plate member 102.

Supposing that opposing forces exerted on each of the respective top parts 92a, 92b, and 92c of the earth electrodes 91A, 91B, and 91C from the second plate member 102 are not equal due to a reason attributable to the shape of the surface of the second plate member 102, for example, surface irregularity, a force for angular movement is exerted on the body 81 of the cradle 80 through the shanks 85A, 85B, and 85C according to inequality in the opposing forces exerted on the respective top parts 92a, 92b, and 92c of the earth electrodes 91A, 91B, and 91C. The hemispherical cavity 83, in which the spherical head 76 is fitted in such a way as to allow the body 81 to tilt, slides along the spherical surface 77 of the spherical head 76 to balance the opposing forces exerted on the earth electrodes 91A, 91B, and 91C. The cradle 80 moves against the elastic urging force of the flexible tube 95 in a tilting manner. In other words, the cradle 80 tilts around the center O2 of the spherical head 76 in accordance with the surface shape of the second plate member 102. Therefore, the respective top parts 92a, 92b, and 92c of the earth electrodes 91A, 91B, and 91C are in conductive contact with the second plate member 102 with an equal pressing force.

In the state in which the first, second, and third earth electrodes 91A, 91B, and 91C are in pressure contact with the second plate member 102, a coolant is in a circulatory manner supplied from the coolant supply source to each of the coolant reservoirs, that is, an inner space between the truncated end of the shank 85A, 85B, 85C and the bottom of the tapered hole of the earth electrode 91A, 91B, 91C, through the coolant passage 68 of the shaft 61, the coolant passage 78 of the tiltable shaft member 70, and the coolant passage 88 of the cradle 80 to cool each of the earth electrodes 91A, 91B, and 91C.

An unillustrated weld electrode is brought into contact with the first plate member 101 at a preset spot position to apply welding pressure thereto. The first plate member 101, to which the weld electrode applies the welding pressure, and the second plate member 102 are in contact with each other at a joint in a conductive manner. A welding current application route is formed that leads from the weld electrode to each of the first, second, and third earth electrodes 91A, 91B, and 91C by way of the first plate member 101, the joint between the first plate member 101 and the second plate member 102, the second plate member 102, and the corresponding point of contact of the earth electrode 91A, 91B, 91C and the second plate member 102.

In the state in which the first plate member 101 is in conductive contact with the second plate member 102 at the joint and, in addition, each of the first, second, and third earth electrodes 91A, 91B, and 91C is in conductive contact with the second plate member 102, a welding current supplied from a welding source is applied from the weld electrode to the earth cable of the earth electrode apparatus 50. As a result of current application, a part of each of the first plate member 101 and the second plate member 102 at the joint melt to form into a nugget N.

Figure 8A:
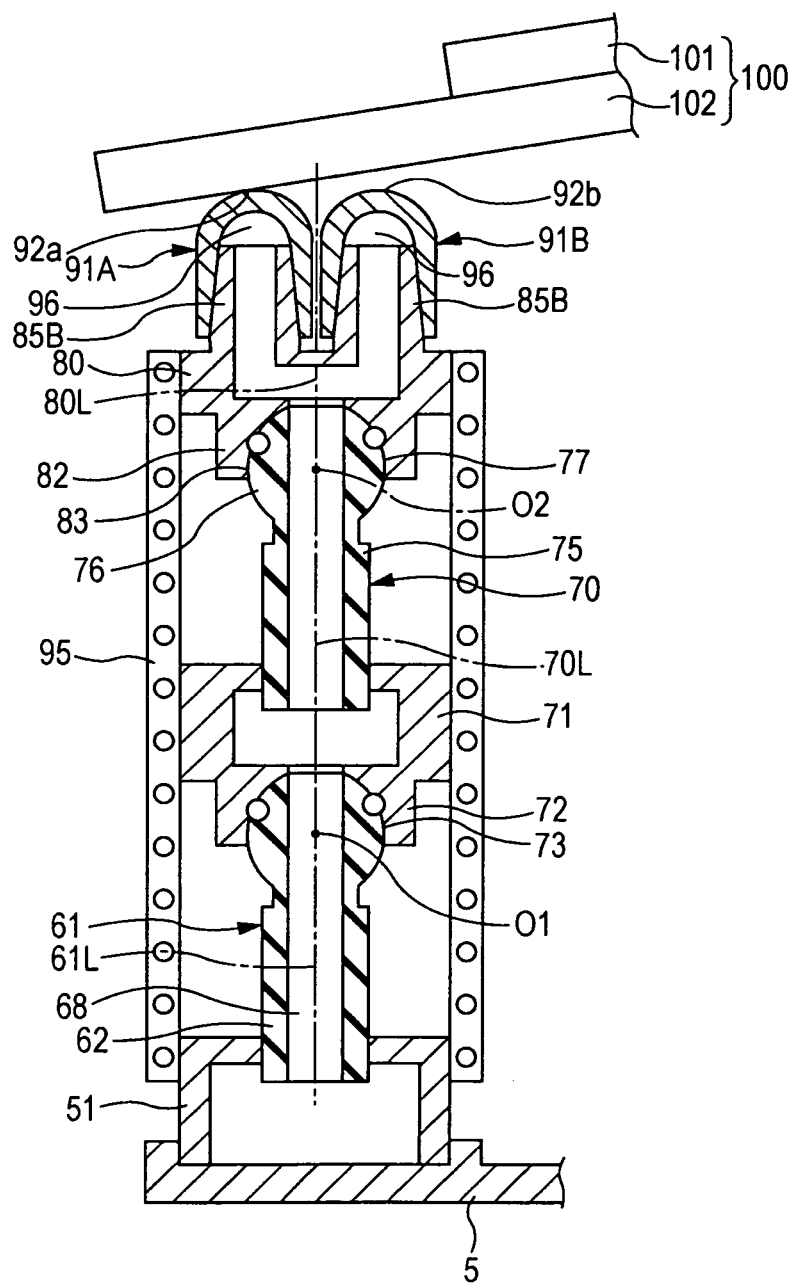
FIG. 8A is an operation diagram.

Supposing that upon the one-sided resistance spot welding of the workpiece 100, which is made up of the second plate member 102 and the first plate member 101 laid on the second plate member 102, as illustrated in FIG. 8A, the earth electrode contact region of the second plate member 102 is inclined and thus not perpendicular to the central axis 61L of the shaft 61 extending in the welding pressure application direction, in which the base 5 approaches the workpiece 100, the earth electrode assembly 50 is moved by means of the robot arm to make the respective top parts 92a, 92b, and 92c of the earth electrodes 91A, 91B, and 91C face the earth electrode contact region of the second plate member 102 by positioning them opposite thereto.

Then, the earth electrode assembly 50 is moved closer to the second plate member 102 by movement force transmission via the base 5. Since the earth electrode contact region is inclined, one of the top parts 92a, 92b, and 92c of the first, second, and third earth electrodes 91A, 91B, and 91C, for example, the top part 92a of the first earth electrode 91A, is brought into contact with the second plate member 102 as illustrated in FIG. 8A. When the earth electrode assembly 50 is moved further for pressure contact with the second plate member 102, an opposing force is exerted on the top part 92a of the first earth electrode 91A from the second plate member 102.

Due to the opposing force exerted on the top part 92a of the first earth electrode 91A from the second plate member 102, a biased opposing force that is decentered from the central axis 80L of the cradle 80 is exerted. For this reason, the cradle 80 tilts until the respective top parts 92b and 92c of the earth electrodes 91B and 91C are brought into contact with the second plate member 102 while maintaining the top part 92a of the first earth electrode 91A in pressure contact with the second plate member 102. At this point in time, the top part 92a of the first earth electrode 91A functions as the fulcrum for the tilting of the cradle 80.

Figure 8B:
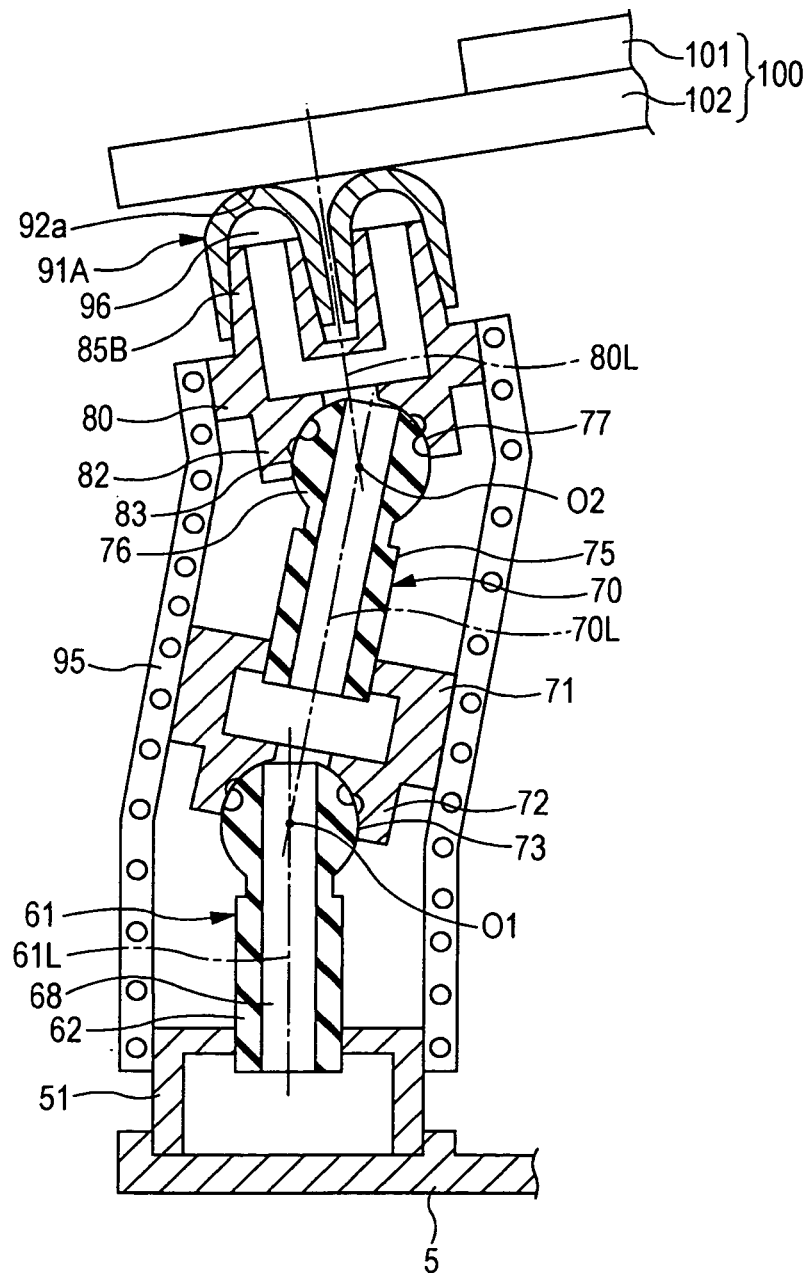
FIG. 8B is an operation diagram.
Figure 9:
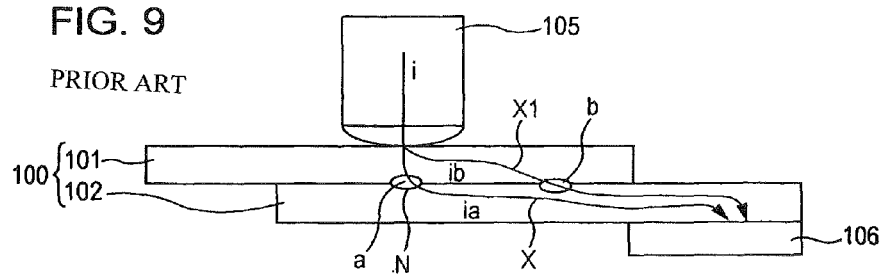
FIG. 9 is a diagram illustrating one-sided resistance spot welding and an earth electrode of related art.
Figure 10:
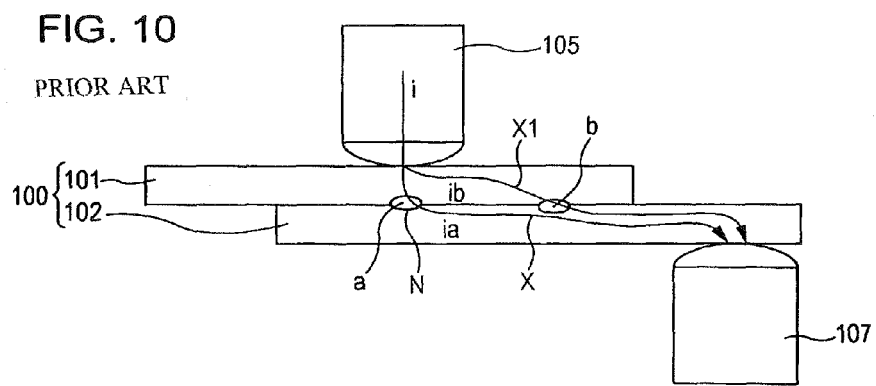
FIG. 10 is a diagram illustrating one-sided resistance spot welding and an earth electrode of related art.
Figure 11:
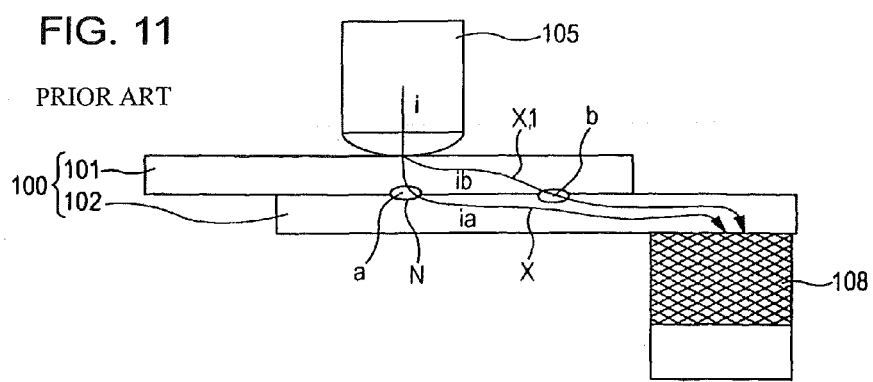
FIG. 11 is a diagram illustrating one-sided resistance spot welding and an earth electrode of related art.
Figure 12:
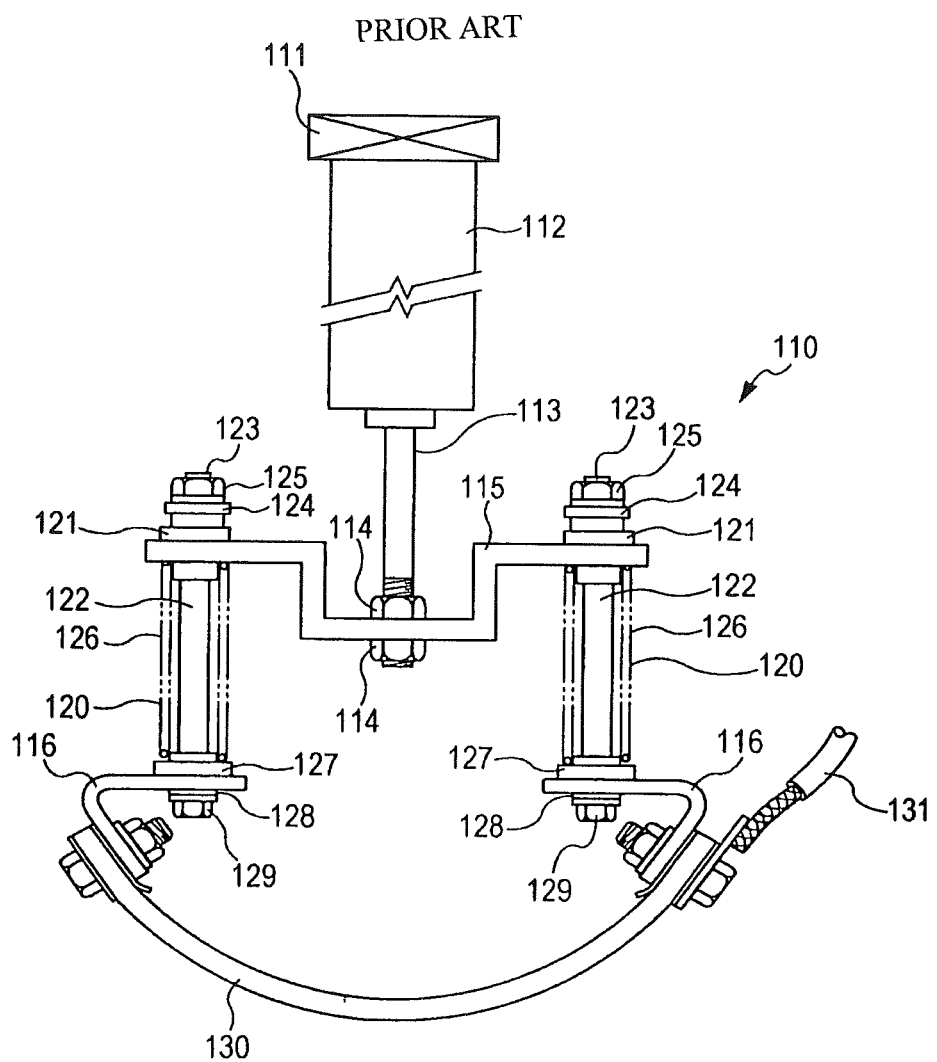
FIG. 12 is a diagram illustrating the overall structure of an earth connection apparatus of related art.

When the cradle 80 having the socket 82, inside which the spherical head 76 of the tiltable shaft member 70 is fitted, tilts while using the top part 92a of the first earth electrode 91A as the fulcrum, the force of the tilting of the cradle 80 is transmitted to the tiltable shaft member 70 as illustrated in FIG. 8B. As a result, the socket 72 of the tiltable shaft member 70 slides along the spherical head 63 of the shaft 61. Thus, it tilts smoothly without being restrained by the shaft 61 at all.

On the other hand, a restraining force that acts against the tilting of the tiltable shaft member 70 relative to the shaft 61 and the tilting of the cradle 80 relative to the tiltable shaft member 70, that is, an urging force for aligning the central axis 61L of the shaft 61, the central axis 70L of the tiltable shaft member 70, and the central axis 80L of the cradle 80 and stretching a combination of the tiltable shaft member 70 and the cradle 80 from the shaft 61, is applied by the flexible tube 95, which has elastic recovery property. With the elastic support by the flexible tube 95, welding pressure is transmitted to the cradle 80 through the attachment pedestal 51, the shaft 61, and the tiltable shaft member 70 to maintain the pressure-contact state of the first, second, and third earth electrodes 91A, 91B, and 91C. The respective top parts 92a, 92b, and 92c of the earth electrodes 91A, 91B, and 91C are in conductive contact with the second plate member 102 at the desired earth electrode contact region with equal contact pressure.

In the state in which the first, second, and third earth electrodes 91A, 91B, and 91C are in contact with the second plate member 102, a coolant is supplied in a circulatory manner from the coolant supply source to each of the coolant reservoirs, that is, an inner space between the truncated end of the shank 85A, 85B, 85C and the bottom of the tapered hole of the earth electrode 91A, 91B, 91C, through the coolant passage 68 of the shaft 61, the coolant passage 78 of the tiltable shaft member 70, and the coolant passage 88 of the cradle 80 to cool each of the earth electrodes 91A, 91B, and 91C.

An unillustrated weld electrode is brought into contact with the first plate member 101 at a preset spot position to apply welding pressure thereto. The first plate member 101, to which the weld electrode applies the welding pressure, and the second plate member 102 are in contact with each other at a joint in a conductive manner. A welding current application route is formed that leads from the weld electrode to each of the first, second, and third earth electrodes 91A, 91B, and 91C by way of the first plate member 101, the joint between the first plate member 101 and the second plate member 102, the second plate member 102, and the corresponding point of contact of the earth electrode 91A, 91B, 91C and the second plate member 102.

In the state in which the first plate member 101 is in conductive contact with the second plate member 102 at the joint and, in addition, each of the first, second, and third earth electrodes 91A, 91B, and 91C is in conductive contact with the second plate member 102, a welding current supplied from a welding source is applied from the weld electrode to the earth cable of the earth electrode apparatus 50. As a result of current application, a part of each of the first plate member 101 and the second plate member 102 at the joint melt to form into a nugget N.

When the earth electrode assembly 50 is moved away from the workpiece 100 after the completion of welding, the cradle 80 urged by the flexible tube 95, which is an example of the tiltable member supporting unit, returns to the preset position where the central axis 80L of the cradle 80 is on the extension of the central axis L1 of the shaft 61, or in other words, the position for stretching a combination of the tiltable shaft member 70 and the cradle 80 in a straight line from the shaft 61.

The present embodiment of the invention offers, for example, the following advantages. The earth electrode apparatus 50 has a simple and compact structure in which the shaft member 70 is coupled to the spherical head 63 of the shaft 61 supported by the base 5 in such a way that the shaft member 70 can tilt and, in addition, the cradle 80 having the first, second, and third shanks 85A, 85B, and 85C, to which the first, second, and third earth electrodes 91A, 91B, and 91C are attached, respectively, is coupled to the spherical head 76 of the tiltable shaft member 70 in such a way that the cradle 80 can tilt. Thanks to its simple and compact structure, the earth electrode apparatus 50 does not occupy much space. In addition, if the surface of the earth electrode contact region of the second plate member 102 is irregular or inclined, the cradle 80 tilts without being restrained by the shaft 61 for balancing with the earth electrode contact region to ensure equal contact pressure for the contact of the respective top parts 92a, 92b, and 92c of the earth electrodes 91A, 91B, and 91C with the second plate member 102 at desired respective positions. Therefore, irrespective of surface irregularity or inclination, the contact of the respective top parts 92a, 92b, and 92c of the earth electrodes 91A, 91B, and 91C with the second plate member 102 is stable. A large area of contact with the second plate member 102, which is the sum of areas of contact at three points between the second plate member 102 and the respective earth electrodes 31A, 31B, and 31C, is secured.

Moreover, since a welding current is split to flow into the first, second, and third earth electrodes 91A, 91B, and 91C through respective points of contact, it is possible to reduce current density at each of the points of contact and to avoid heat generation ascribable to conductive resistance at each of the points of contact. With such a reduction in current density combined with the cooling of the earth electrodes 91A, 91B, and 91C by using a circulatory coolant, it is possible to avoid the second plate member 102 and the earth electrodes 91A, 91B, and 91C from being damaged locally due to melting.

Moreover, the heat adhesion of the second plate member 102 and the earth electrodes 91A, 91B, and 91C is far less likely to occur. Since welded members such as the second plate member 102 are substantially free from damage, the quality of welding improves. In addition, the earth electrodes 91A, 91B, and 91C are substantially free from damage. Furthermore, since heat at the first, second, and third earth electrodes 91A, 91B, and 91C is moderate, it does not increase the wear of the earth electrodes 91A, 91B, and 91C.

Furthermore, depending on the degree of the wear of any earth electrode 91A, 91B, 91C or the degree of the damage thereof, it is possible to replace the worn-out or damaged electrode with new one independently, that is, without any need to replace the other electrodes that are still usable at the same time. In addition, commonly-used weld electrodes can be adopted for use with the earth electrode apparatus disclosed herein. Such independent electrode replacement, when combined with use of commonly-used electrodes, makes it possible to simplify maintenance and reduce running costs.

In the foregoing embodiments of the invention, an earth electrode apparatus is applied to one-sided resistance spot welding. However, the scope of the invention is not limited thereto. The earth electrode apparatus disclosed herein may be applied to, for example, arc welding or plasma welding.

What is claimed is:

1. An earth electrode apparatus for conductive contact of an earth electrode with a workpiece, comprising:
   a shaft supported by a base disposed opposite to the workpiece;
   a tiltable member having a pedestal and first, second, and third shanks, the pedestal being coupled to the shaft in a tiltable manner, the first, second, and third shanks protruding from the pedestal; and
   first, second, and third earth electrodes attached to ends of the first, second, and third shanks, respectively,
   wherein all of the first, second, and third earth electrodes are brought into contact with the workpiece as a result of relative movement of at least one of the workpiece and the base closer to each other.

2. The earth electrode apparatus according to claim 1, wherein
   the shaft includes a shaft body having a base end fixed to the base, and
   a spherical part having a spherical surface formed at an end of the shaft body;
   the tiltable member includes
   the pedestal,
   a socket that extends from the pedestal and has a hemispherical or roughly hemispherical cavity formed inside the socket with an opening at an end, the spherical part being fitted in the cavity in such a way as to allow the cavity to slide along the spherical surface of the spherical part, and
   the first, second, and third shanks protruding from the pedestal in a direction away from the socket; and
   the first, second, and third earth electrodes are detachably attached to the ends of the first, second, and third shanks, respectively.

3. The earth electrode apparatus according to claim 1, wherein each of the shanks has a tapered conical earth electrode attachment part at an end side; and each of the earth electrodes includes a hemispherical top part and a cylindrical base part that are formed integrally, has a tapered hole in which the electrode attachment part can be fitted, and has a cylindrical shape with a bottom.

4. The earth electrode apparatus according to claim 3, wherein the earth electrode apparatus is applied to one-sided resistance spot welding; and a coolant reservoir is formed between the end of each of the shanks and a bottom of the tapered hole of the corresponding one of the earth electrodes when the earth electrode attachment part of each of the shanks is fitted in the tapered hole of the corresponding one of the earth electrodes for attachment.

5. An earth electrode apparatus for conductive contact of an earth electrode with a workpiece, comprising:
   a shaft supported by a base disposed opposite to the workpiece;
   a tiltable shaft having a tiltable-shaft pedestal coupled to the base-supported shaft in a tiltable manner;
   a tiltable member having a tiltable-member pedestal and first, second, and third shanks, the tiltable-member pedestal being coupled to the tiltable shaft in a tiltable manner, the first, second, and third shanks protruding from the tiltable-member pedestal; and
   first, second, and third earth electrodes attached to ends of the first, second, and third shanks, respectively,
   wherein all of the first, second, and third earth electrodes are brought into contact with the workpiece as a result of relative movement of at least one of the workpiece and the base closer to each other.

6. The earth electrode apparatus according to claim 5, wherein
   the base-supported shaft includes
   a shaft body having a base end fixed to the base, and
   a spherical part having a spherical surface formed at an end of the shaft body;
   the tiltable shaft includes
   a tiltable-shaft socket that extends from the tiltable-shaft pedestal and has a hemispherical or roughly hemispherical cavity formed inside the tiltable-shaft socket with an opening at an end, the spherical part of the base-supported shaft being fitted in the cavity of the tiltable shaft in such a way as to allow the cavity of the tiltable shaft to slide along the spherical surface of the spherical part of the base-supported shaft, and
   a tiltable-shaft body protruding from the tiltable-shaft pedestal in a direction away from the tiltable-shaft socket, a spherical part with a spherical surface being formed at an end of the tiltable-shaft body;
   the tiltable member includes
   a tiltable-member socket that extends from the tiltable-member pedestal and has a hemispherical or roughly hemispherical cavity formed inside the tiltable-member socket with an opening at an end, the spherical part of the tiltable shaft being fitted in the cavity of the tiltable member in such a way as to allow the cavity of the tiltable member to slide along the spherical surface of the spherical part of the tiltable shaft, and
   the first, second, and third shanks protruding from the tiltable-member pedestal in a direction away from the tiltable-member socket; and
   the first, second, and third earth electrodes are detachably attached to the ends of the first, second, and third shanks, respectively.

7. The earth electrode apparatus according to claim 5, further comprising a tiltable member supporting unit for urging the tiltable member to a preset position with respect to the base-supported shaft.

8. The earth electrode apparatus according to claim 5, wherein each of the shanks has a tapered conical earth electrode attachment part at an end side; and each of the earth electrodes includes a hemispherical top part and a cylindrical base part that are formed integrally, has a tapered hole in which the electrode attachment part can be fitted, and has a cylindrical shape with a bottom.

9. The earth electrode apparatus according to claim 8, wherein the earth electrode apparatus is applied to one-sided resistance spot welding; and a coolant reservoir is formed between the end of each of the shanks and a bottom of the tapered hole of the corresponding one of the earth electrodes when the earth electrode attachment part of each of the shanks is fitted in the tapered hole of the corresponding one of the earth electrodes for attachment.

\* \* \* \* \*